Jan. 27, 1970     J. M. THOMPSON     3,492,023

APPARATUS FOR DISABLING A TRAILER HITCH

Filed July 17, 1968

INVENTOR
JACK M. THOMPSON

BY

*Browne, Schuyler & Beveridge*

ATTORNEYS

United States Patent Office

3,492,023
Patented Jan. 27, 1970

3,492,023
APPARATUS FOR DISABLING A TRAILER HITCH
Jack M. Thompson, Box 1771, Ardmore, Okla. 73401
Filed July 17, 1968, Ser. No. 745,587
Int. Cl. B60c 1/06, 1/12
U.S. Cl. 280—507                                13 Claims

ABSTRACT OF THE DISCLOSURE

This device is locked within the spherical socket of a trailer hitch to prevent unauthorized users from towing the trailer. A cam which may be locked in any of a plurality of angular positions extends a locking obstruction radially from the device to prevent removal of the device from the hitch socket. The portion of the locking obstruction lying outwardly from the body is sufficiently broad to provide areas which lie at least 90° apart on radii generated from the center of the device.

BACKGROUND OF THE INVENTION

The purpose of this invention is to provide a trailer owner with a simple, useful and convenient device which will prevent unauthorized persons from moving trailers which are provided with conventional spherical socket hitches. This device is inserted into a spherical trailer hitch socket and then locked therein, thus foreclosing others from placing the hitch on the towing ball of another vehicle.

Devices of this general nature are known in the prior art. Various types of locking balls, some of which have radially projectable obstructions, have been used. Some require modification of the trailer socket itself, and others require a complicated mechanism and a complexly shaped ball to perform their intended function.

SUMMARY OF THE INVENTION

This invention pertains to apparatus for disabling a trailer hitch of the spherical socket type, which is capable of being lockably retained within the trailer hitch socket. The device of the invention involves a main body, a movable obstruction member projectable from the body, means for moving the obstruction member outwardly from the body, and means for locking the obstruction member in an extended position.

Two principal features distinguish this invention from prior art devices of a similar character. First, the obstruction member is movable to any of a plurality of extended positions at which it may be locked. Heretofore, such obstruction members were only movable to a single extended position, which rendered the devices incapable of utilization in a wide variety of trailer hitches.

A second characterizing feature of the device of this invention involves the shape of the movable obstruction member which is relatively broad when contrasted to prior art devices. The movable obstruction described herein is sufficiently broad to provide areas which lie at least 90° apart on radii generated from the center of the body of the device.

Several advantages are enjoyed by this invention which were not available previously. The device is suitable for use with a wide variety of trailer hitches due to the ability of the locking obstruction to be locked in any of a plurality of extended positions and, this feature also results in a more positive and secure locking engagement within the hitch socket due to the ability of the locking obstruction to be extended to the fullest degree possible within a trailer hitch.

An advantage accruing from the broad locking obstruction is that it prevents unauthorized users from removing the locking device by twisting and turning it.

Other advantages of the invention are that it is easily manufactured, simple to operate and reliable in use throughout extended periods of time.

THE DRAWINGS

The drawings herein illustrate only one of many possible variations of the invention.

DESCRIPTION OF THE PREFERRED EMBODIMENT

Figure 1:
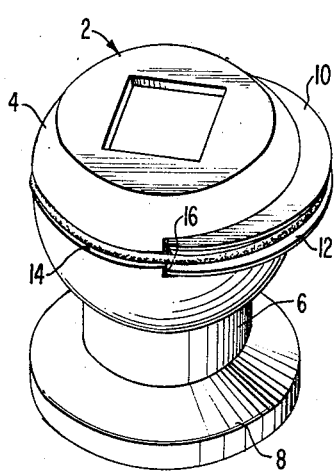
FIGURE 1 is a perspective view of the locking device of the invention.

As seen in FIGURE 1, the main body 2 of the device includes an upper spherical portion 4, a reduced neck portion 6 and a bottom flange 8. The body 2 is generally hollow and is adapted to support a radially projectable locking obstruction 10. This obstruction 10 has an arcuate peripheral groove 12 which is aligned with a groove 14 on the spherical portion 4 in order to receive an annular band 16 of elastic material which normally is under tension. The band 16 biases the obstruction member 12 inwardly toward the center of the body 2.

Figure 2:
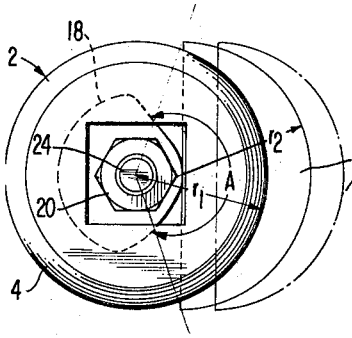
FIGURE 2 is a plan view of the device of FIGURE 1, showing the two extreme positions of the locking obstruction member.

FIGURE 2 indicates the relative dimensions of the locking obstruction 10 and the spherical portion 4 of the device. The portion of the locking obstruction 10 which extends outwardly beyond the spherical portion 4 is sufficiently broad to provide areas which lie on radii at least 90° apart generated from the center of the device. Preferably the angle A between such radii is of the order shown at about 130°. The radius $r_2$ of the arcuate outer surface of the locking obstruction 10 is approximately equal to the corresponding radius $r_1$ of the spherical body, both radii being measured in parallel planes which are horizontal when the device is in use.

Figure 6:
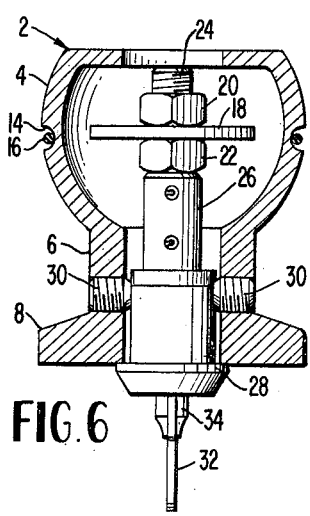
FIGURE 6 is a sectional view of the device of the invention as seen along the lines of 6—6 in FIGURE 4.

The locking obstruction 10 is movable radially against the force generated by the elastic band 16 by means of cam 18 which is shown in various positions in FIGURES 2–6. The cam 18 is held between a pair of nuts 20 and 22 on a threaded portion 24 of shaft 26. The shaft 26 is rigidly connected to the rotatable portion of a key-operated lock 28. FIGURE 6 shows the lock 28 with its housing rigidly held to the body 2 by means of set screws 30.

Figure 5:
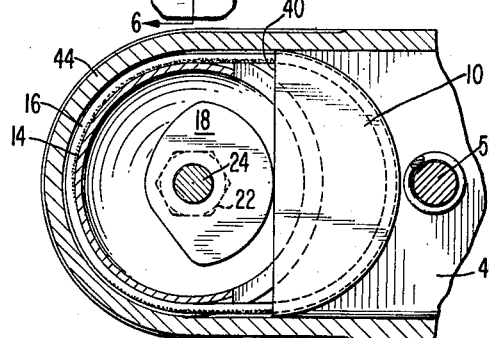
FIGURE 5 is a sectional view of the locking obstruction as seen through the section line 5—5 in FIGURE 4.
Figure 7:
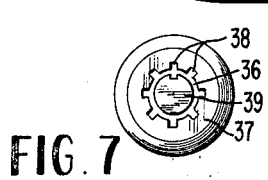
FIGURE 7 is an end view of the lock used in conjunction with this locking device.

The lock 28 is of a type generally disclosed in U.S. Patent 1,984,202, modified to permit the shaft 26 to assume four or more locked positions. The key 32 has a tubular body 34 which is insertable into the cylindrical space 36 illustrated in FIGURE 7. This space lies between the stationary face plate 37 and the rotatable pin 39 which is movable with the shaft 26. The tubular portion 34 of the key has an outwardly radiating projection. Removal and insertion of the key is possible only when the radiating projection on the key is aligned with one of the areas 38 on the face plate 37. Therefore, the lock is capable of being locked in any one of eight different positions. Of course, different portions of the cam 18 will lie against the rear face 40 of the locking obstruction 10, see FIGURE 5. Since the cam 18 has varying radial dimensions measured from the axis of the shaft 26, a variety of extended positions of the locking projection 10 is obtainable. As shown in FIGURE 5, the cam is in a position which produces the maximum projection of the locking obstruction 10.

Figure 3:
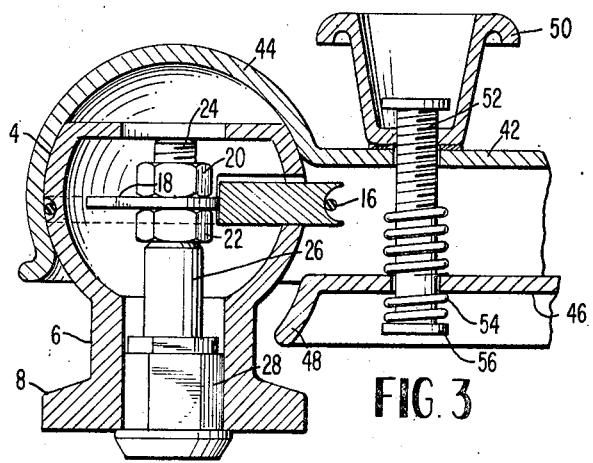
FIGURE 3 is a sectional view showing this invention within a trailer hitch, with the locking obstruction in its retracted position.
Figure 4:
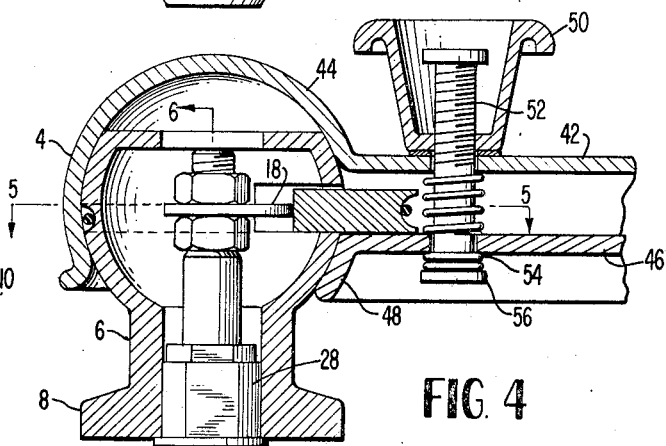
FIGURE 4 is a view similar to FIGURE 3, but illustrating the locking obstruction of the device in its extended and locking position.

For purposes of illustration, the invention is shown in FIGURES 3-5 in conjunction with a handwheel operated trailer hitch; however, it is equally suited to use with trailer hitches which are actuated by levers or other devices.

The spherical socket in the illustrated trailer hitch includes an upper tongue 42 which carries the upper spherical portion 44. A lower tongue 46 carries a lower spherical portion 48. In a usual fashion, the tongues 42 and 46 are brought toward each other to engage a standard trailer ball therebetween in a manner permitting angular movement of the ball within the socket.

Tongues 42 and 46 are brought together by rotation of hand wheel 50 which is threaded on a shaft 52 which passes freely through the tongue 42 and is attached at its lower end to the tongue 46. Slight freedom of movement between the tongue 46 and the member 52 is permitted by means of the coil spring 54 which acts between the enlarged end portion 56 and the tongue 46. The relative position of the spherical socket and trailer hitch when engaged with a normal towing ball is shown in FIGURE 4.

From the foregoing description, the manner of utilizing the locking device of this invention will be evident. The device is inserted into the spherical socket of the hitch in the manner shown in FIGURE 3. Then, with the tubular portion 34 of the key 32 inserted into the lock 28, the shaft 26 is turned until the cam 18 urges the locking obstruction 10 into the space between the tongues 42 and 46. The extent of outward movement of the tongue 10 may sometimes be limited by the dimensions and mechanical arrangement of the trailer hitch itself. In any event, the locking obstruction 10 may be extended to the maximum amount permissible in the particular type of trailer hitch. When in its extended position, the locking obstruction 10 will prevent unauthorized removal of the spherical portion 4 of the locking device 2 from the trailer socket and therefore will prevent any unauthorized towing of the trailer.

Although only a single embodiment of the invention has been shown for purposes of illustration, it is expected that a number of variations thereto may easily be adapted by those working in the art. Accordingly, this invention is not limited to the sole illustrated embodiment but includes numerous modifications, substitutions and improvements.

I claim:

1. Apparatus for disabling a trailer hitch of the spherical socket type, comprising, a body with a longitudinal central axis and a generally curved spherical surface portion having dimensions adapted to permit its insertion into the spherical socket of a trailer hitch and having a shape adapted to conform to the interior wall of such a socket, a movable obstruction member projecting laterally from the body, means for moving the obstruction member outwardly from the longitudinal central axis to a plurality of extended positions which lie different lateral distances from the body surface, and locking means for maintaining the obstruction member at a fixed distance from the body surface in any of its said extended positions.

2. Apparatus according to claim 1 wherein the body and the obstruction member are surrounded by an elastic member under tension, whereby the elastic member tends to bias the obstruction member inwardly from its extended positions.

3. Apparatus according to claim 2 wherein the elastic member is an annular band, and the body and the obstruction member have grooves which receive the elastic member.

4. Apparatus according to claim 1 wherein the obstruction member has an outer surface beyond the body which is sufficiently broad to provide areas which lie at least 90° apart on radii generated from the center of the body.

5. Apparatus according to claim 4 wherein outer surface is arcuate and has a radius which is approximately equal to the corresponding radius of the body.

6. Apparatus according to claim 1 wherein the means for moving the obstruction member is a cam which is mounted for rotation about an axis which extends through the center of the body, and cam follower means associated with the obstruction member for moving the obstruction member in response to rotation of the cam.

7. Apparatus according to claim 6 wherein the means for locking the obstruction member is a key-operated lock having a casing secured to the body and a rotatable portion secured to said cam.

8. Apparatus according to claim 7 wherein the lock is constructed to permit removal of a key therefrom at at least four angular positions of the lock.

9. Apparatus according to claim 8 having an elastic member under tension surrounding the body and the obstruction member, whereby the elastic member tends to bias the obstruction member inwardly from its extended positions.

10. Apparatus according to claim 8 wherein the obstruction member has an outer surface beyond the body which is sufficiently broad to provide areas which lie at least 90° apart on radii generated from the center of the body.

11. Apparatus for disabling a trailer hitch of the spherical socket type comprising a body with a longitudinal central axis and a generally curved spherical surface portion having dimensions adapted to permit its insertion into the spherical socket of a trailer hitch, and having a shape adapted to conform to the interior wall of such a socket, a movable obstruction member projecting radially from the body in a lateral direction when mounted in said socket to provide a surface having areas which lie at least 90° apart on radii from the center of the body, means for moving the obstruction member laterally outwardly to a position extended with respect to the body, and means for locking the obstruction member in its extended position.

12. Apparatus according to claim 11 wherein the means for moving the obstruction member is a cam which is mounted for rotation about an axis which extends through the center of the body, and cam follower means associated with the obstruction member for moving the obstruction member in response to rotation of the cam.

13. Apparatus according to claim 12 wherein the means for locking the obstruction member is a key-operated lock having a casing secured to the body and a rotatable portion secured to said cam.

References Cited

UNITED STATES PATENTS

| 3,237,969 | 3/1966 | Geresy | 280—511 |
| 3,257,126 | 6/1966 | Robertson | 280—511 |

LEO FRIAGLIA, Primary Examiner

R. R. SONG, Assistant Examiner

U.S. Cl. X.R.

70—258